US008244518B2

(12) United States Patent
Chan et al.

(10) Patent No.: US 8,244,518 B2

(45) Date of Patent: Aug. 14, 2012

(54) INPUT/OUTPUT PROCESSOR (IOP) BASED ZSERIES EMULATION

(75) Inventors: Ping T. Chan, Fishkill, NY (US); Paul M. Gioquindo, Poughkeepsie, NY (US); Ying-Yeung Li, Poughkeepsie, NY (US); Bruce H. Ratcliff, Red Hook, NY (US); Stephen R. Valley, Valatie, NY (US); Mooheng Zee, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/355,903

(22) Filed: Jan. 19, 2009

(65) Prior Publication Data

US 2010/0185898 A1 Jul. 22, 2010

(51) Int. Cl.
*G06F 9/455* (2006.01)

(52) U.S. Cl. ........................... 703/23; 710/105; 709/230

(58) Field of Classification Search ..................... 703/23
See application file for complete search history.

(56) References Cited

U.S. PATENT DOCUMENTS 5,652,914 A * 7/1997 Eckert et al. .................... 710/36
2003/0037178 A1* 2/2003 Vessey et al. ................. 709/319
2003/0093649 A1 5/2003 Hilton
2005/0268071 A1* 12/2005 Blandy et al. ................. 711/208
2005/0289246 A1* 12/2005 Easton et al. ..................... 710/1

OTHER PUBLICATIONS

Baskey et al, "zSeries Features for Optimized Sockets-Based Messaging: HiperSockets and OSA-Express", IBM J. Res. & Dev. vol. 46, No. 4/5, Jul./Sep. 2002.*

Amrehn et al, "Linux on IMB zSeries and S/390: High Availability for z/VM and Linux", Redbooks Paper, IBM 2002.*

Gregg, T.A., "S/390 CMOS server I/O: The Continuing Evolution", IBM J. Res. Develop. vol. 41, No. 4/5, Jul./Sep. 1997.*

IBM, Inc., "OSA-Express Customer's Guide and Reference", pp. 3-10, 2003-2006.*

Zee et al, "IBM System z9 Open Systems Adapter for Communication Controller for Linux", IBM J. Res. Develop. vol. 51, No. 1/2, Jan./Mar. 2007.*

* cited by examiner

*Primary Examiner* — Mary C Jacob

(74) *Attorney, Agent, or Firm* — John E. Campbell; Blanche E. Schiller, Esq.; Heslin Rothenberg Farley & Mesiti P.C.

(57) ABSTRACT

The emulation of a data processing I/O protocol employs a process which obviates the need to consider hardware specific functionality for which emulation is not an optimal solution. The particular protocol described in exemplary fashion herein is the OSA protocol as defined by Open System Adapter standards. The use of this emulation is also seen to leave in place all of the software tools otherwise employed.

15 Claims, 4 Drawing Sheets

INPUT/OUTPUT PROCESSOR (IOP) BASED ZSERIES EMULATION

TECHNICAL FIELD

In general, the present invention relates to the emulation of functions from a source computer architecture to produce instructions that run on a target machine architecture. More particularly, the present invention is directed to the emulation of portions of a data processing system other than the CPU (Central Processing Unit) architecture. Even more particularly, the present invention is directed to the emulation of I/O (input/output) processors.

BACKGROUND OF THE INVENTION

Emulation technology is becoming more prevalent in the industry due to the rising cost of hardware development, especially on high end systems. The resurgence of the mainframe class of machine has created an increased desire for code developers to write applications for this type of machine. One of the most significant ones of the high end systems is the zSeries™ of data processor manufactured and marketed by the assignee of the present invention. However, the cost factor for these high end systems is discouraging program writers and designers from working in this area, especially for development and for training purposes. Several vendors now provide zSeries™ processor emulations that run on either a UnixWare or Linux based workstation. However, included with the processor emulation is the increasing desire to emulate other parts of the system including DASD, coupling, I/O, and networking functions. Queued Direct I/O was introduced in 1990. It is a state-of-the-art I/O architecture which provides fast host to LAN communication. With the emulator of the present invention, several changes have been made to enhance the architecture and to improve Queued Direct I/O (QDIO) function on Linux and AIX® platforms. It is also noted that while the present invention focuses upon the Open System Adapter (OSA) as an emulation target, the principle methods and structures of the present invention are equally applicable to other adapters, an adapter simply being a piece of hardware used by a CPU, server, data processor, mainframe or the like for external communications.

SUMMARY OF THE INVENTION

In accordance with the present invention, there is provided a method which includes instructions stored within a host system memory, for implementing data transfer protocols which emulate an Open System Adapter. The method comprises the steps of: (1)establishing a connection between a first portion of the host system memory, which is allocated for input/output operations, and a second portion of the host system memory, which is allocated as a buffer for data transfer operations based on the desired protocol, OSA in particular; (2) initializing parameters used for directing and structuring data transfer between the memory portions; (3) sending a data transfer related command to a first process; (4) sending a command from the first process to an Open System Adapter emulation process; and (5) transferring data, via a memory copy operation, between the memory portions in accordance with the initialization parameters and the data transfer command.

Two designs are presented both of which are intended to implement emulation of OSA in this environment: a solution that contains a traditional I/O-processor-like system structure and a streamed down structure, titled the "device manager" (DM) structure.

A software structure is presented that provides an exact I/O zSeries™ representation for OSA. The focus of the design is to port the current zSeries OSA functions, keeping the existing infrastructure so that future enhancements and additions of other OSA adapter types are also possible.

The OSA function runs as single UNIX process in both the AIX® and INTEL® Linux environments. The OSA function works in conjunction with an IOP process that emulates an OSA Chpid (Channel Path ID). Along with the emulated OSA there is provided a LAN adapter on the AIX® platform that provides hardware assists presently available on the zSeries™ mainframe. For the present implementation, each OSA Chpid (that is, each OSA process+IOP process) is dedicated to a single LAN adapter provided by the workstation that runs the emulator software. The emulated OSA runs on Linux Commercial SuSE 10.x and on AIX® 5.3 or above. It will run on a Power based workstation and Intel based workstations. Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
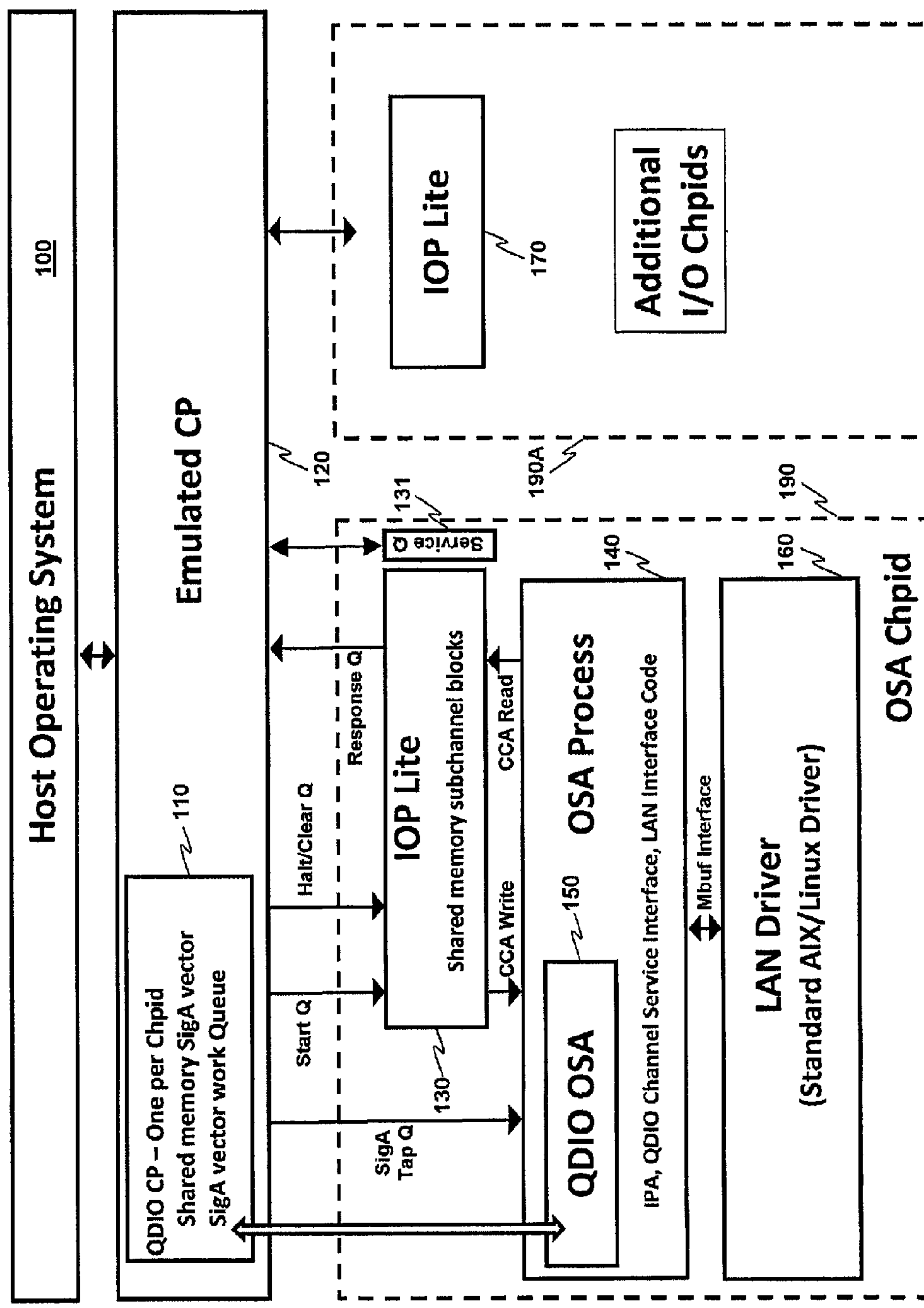
FIG. 1 is a block diagram illustrating the environment in which the present invention is employed and more particularly showing its connections to other system components.

FIG. 1 provides a description structure of the present invention as it relates to the details of an I/O operation for a single OSA Chpid 190 running in an emulation environment and with an indication of how and where multiple channel paths are also provided (see reference numeral 190A). The structure comprises OSA process 140 that communicates with host 100 running on emulated CP 120 through a TCP/IP stack via block 110, 150 or SNA (System Network Architecture) stack with a one-to-one match to IOPLite process 130 (and process 170 for a distinct channel path 190A. The IOPLite processes communicate via a CCA (Channel Control Address) interface which is described more particularly below. Service queue 131 is implemented to handle service functions that might need to be queued for later processing. Traffic from the LAN also reaches host 100 via the CCA and LAN Driver 160. OSA process 140 communicates with the default Operating System LAN driver (native to Linux or AIX®) via the standard LAN driver interfaces provided by the operating system.

The IOPLite process communicates to the OSA process via a vector referred to herein as SIGUSR2. In the discussions herein, the IOPLite to OSA CCA signal is referred to as the SIGUSR2 vector. It is issued to/from IOPLite to indicate that work is present (that is that data is ready to be sent or received). The CCA location is mapped into HSA (Host System Area) space for OSA in accordance with the specified Chpid number. OSA process 140 provides a read/write CCA function that is linked into the IOPLite process. Note that presently, the number of words to read or write is set to 2. The format of the CCA invocation is as follows:

int write_cca (Bit16 chpid number, Bit8 command, Bit8 number of words to write, Bit32*data_to_write)

int read_cca (Bit16 chpid number, Bit8 command, Bit8 number of words to read, Bit32*data_to_read)

The command codes employed in this invocation are set forth in the table below:

TABLE I

| CCA Op Code's | Value |
|---|---|
| Read CCA | 0x01 |
| Read CCA and reset BUSY | 0x02 |
| Read CCA and reset Interrupt | 0x03 |
| Read CCA and reset BUSY and Interrupt | 0x04 |
| Read Interrupt | 0x0A |
| Reset Interrupt | 0x0B |
| Set Interrupt | 0x0C |
| Reset Busy | 0x0D |
| Set Busy | 0x0E |
| Conditional Write and set Interrupt | 0x3F |
| Unconditional Write and set Interrupt | 0x40 |

The following tables indicate basic lock value information. These lock values are checked for lock use before a write operation; typically they are checked to see whether or not they contain non-zero values.

TABLE II

| Lock Value | Meaning |
|---|---|
| 0x00000000 | Free - Either side can acquire the lock |
| 0x04000000 | IOP lock - IOP owns the CCA and is making updates |
| 0x04000070 | IOP lock and locked channel - Channel is done updating, set the IV bit to channel and passed the lock to IOP |
| 0x70000000 | Channel lock - Channel owns the CCA and is making updates |
| 0x70000004 | Channel lock and lock by IOP - IOP is done updating, set the IV bit to channel and passed the lock to channel |

The following table illustrates control information used by the control program to check busy status.

TABLE III

| Interrupt Vector Bit | Definition |
|---|---|
| Bit 31 | CCA busy |
| Bit 30 | IOP interrupt bit |
| Bit 29 | Channel interrupt bit (CCA tap) |
| Bit 28-0 | Reserved |

The following table describes the various return codes provided and their meanings.

TABLE IV

| Return Codes | Value |
|---|---|
| Operation completed successfully | 0x00 |
| CCA is busy | 0x01 |
| Reset BUSY/Interrupt failed because CCA is to OSA | 0x02 |
| Invalid Opcode | 0x03 |

Behavior: By using the combination of locks and Interrupt Vector (IV) bits shown above, the performance closely matches that which is achieved in hardware alone. The process works as follows:

if (lock==free)
set lock to owner lock
write CCA Wd 0 and Wd 1
set IV bit and busy bit
change lock to 70000004 or 04000070 (depending which side is writing) else (lock!=Free)
check( lock value & IV) to determine if the state of the CCA
either queue the CCA if the CCA is to other side or read the CCA and save it then write the CCA When done with the CCA, the Interrupt Vector is reset and the lock is cleared.

Initialization Flow A 256 bit entry Chpid Directory is created in shared memory in the HSA location. All Chpids register the following information upon Chpid initialization:

TABLE V

| IO__CHPID__DIRECTORY__HEADER LAYOUT (512 bytes) |
|---|
| Chpid Type (2 bytes) |
| Chpid State (2 bytes) |
| Code Version (4 bytes) |
| Slot # (2 bytes) |
| Port # (2 bytes) |
| Card # (4 bytes) |
| Chpid # (2 bytes) |
| Interface# (2 bytes) |
| Interface Name (12 bytes) |
| Device Specific Information (480 bytes) |

TABLE VI

| OSA__Specific layout (480 Bytes) |
|---|
| Function Mask (4 bytes) |
| Recovery Function Mask(4 bytes) |
| Siga Vector Location Identifier (8 bytes) |
| IOPLite Chpid Process ID (8 bytes) |
| OSA Chpid Process ID (8 bytes) |
| Recovery Chpid Process ID (8 bytes) |
| HSA Location Identifier (8 bytes) |
| Siga Process ID (8 bytes) |
| Service Process ID (8 bytes) |
| CCA Location Identifier (8 bytes) |

TABLE VI-continued

| OSA_Specific layout (480 Bytes) |
|---|
| Reserved (8 bytes) |
| OSA Trace Location (8 bytes) |
| OSA Log Location (8 bytes) |
| OSA Logout Location (8 Bytes) |
| OSA Function Supported Mask (8 bytes) |
| Config File name (128 bytes) |
| 240 Bytes Reserved |

Figure 2:
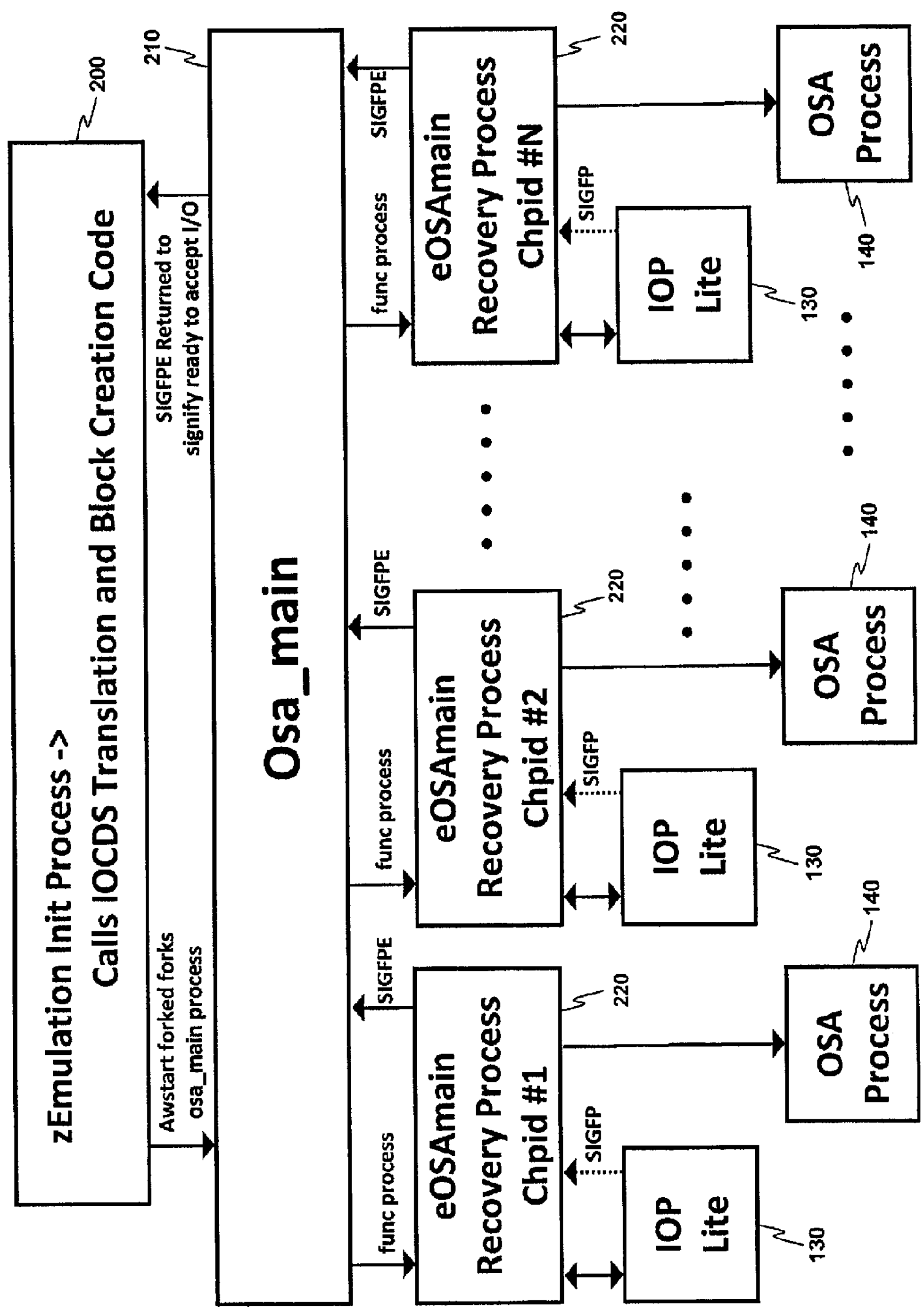
FIG. 2 is a block diagram illustrating the fact that the present invention provides multiple paths for data flow and includes independently in each path a separate recovery process.

Prior to the creation of the Chpid process, the IOCDS is parsed 200 (FIG. 2). This is done by a Master I/O Process 210 which parses the IOCDS and creates all the necessary control blocks for all Chpids in a Shared Memory Area (See FIG. 4) which looks like HSA on a zSeries™ machine. The memory region for each Chpid is defined to be a specific Shared Memory Region (Name) so as to protect other Chpids from accessing HSA outside of its Chpid area.

Once the IOCDS is parsed and all the HSA Control Blocks for all Chpids have been built, the individual Chpid processes is created. One "parent" process 220 is created for each defined Chpid. From the Parent Chpid Process, the OSA 140 and IOPLite processes 130 are created as CHILD processes to the main Chpid process. This design helps in the error recovery scenarios. A "heartbeat" message is used between the Parent Chpid process and the IOP and OSA process to detect "hang" conditions. If an "abend" occurs, a Signal (SIGCHILD) is sent to the Parent Chpid process to signal the "abend". This signal is used by the Parent to "logout" the information for the OSA or IOPLite process.

The parameter passed to the Chpid process at creation time is the Chpid Number. All other OSA shared memory names are derived from the chpid number. The I/O recovery process and I/O Chpid process are identified by a lookup in the shared Chpid Directory shown below in Table VII.

TABLE VII

| Chpid Type | Value |
|---|---|
| Real I/O - Escon | 0x03 |
| CTC | 0x08 |
| Pacer | 0x06 |
| Byte Pacer | 0x05 |
| Emulated I/O | 0x1F |
| OSD | 0x11 |
| OSE | 0x10 |
| OSC | 0x14 |

TABLE VIII

| Chpid State Mask | Value |
|---|---|
| UnDefined - not in use | 0x0000 |
| Defined - in use - defined in IOCDS | 0x0001 |
| PCI Card Identified | 0x0002 |
| Definition Error | 0x0004 |
| Interface Found | 0x0008 |
| Northpole Card Found | 0x0010 |
| OSA Card Found | 0x0020 |
| Recovery Process Started | 0x0100 |
| Chpid Process Ready | 0x8000 |
| Reserved | |

TABLE IX

| Card Type | Value |
|---|---|
| Goliad | 14106902 |
| Duval | 14108902 |
| Concho | |
| Northpole | "np4m" |

TABLE X

| Function Mask (for OSA) | Value |
|---|---|
| ARP_ASSIST | 0x00000001 |
| INBOUND_CHECKSUM_PROCESSING | 0x00000002 |
| OUTBOUND_CHECKSUM_PROCESSING | 0x00000004 |
| IP_FRAGMENTATION_REASSEMBLY | 0x00000008 |
| BROADCAST_FILTERING | 0x00000010 |
| IP_V6_SUPPORT | 0x00000020 |
| MULTICAST_ASSIST | 0x00000040 |
| BROADCAST_ASSIST | 0x00000080 |
| ARP_INFO_SUPPORT | 0x00000100 |
| ARP_STATS_SUPPORT | 0x00000200 |
| SETADAPTERPARMS_ASSIST | 0x00000400 |
| VLAN_ASSIST | 0x00000800 |
| PASSTHRU_ASSIST | 0x00001000 |
| FLUSH_ARP_SUPPORT | 0x00002000 |
| FULL_VLAN_SUPPORT | 0x00004000 |
| FORCE_INBOUND_PASSTHRU | 0x00008000 |

TABLE XI

| Recovery Mask | Value |
|---|---|
| Basic Recovery | 0x00000001 - chpid x-stop |
| Reserved | All other values |

The OSA Config Name points to a file on a hard drive where all of the OSA parameters are kept that need to be saved across resets, such as MAC address, trace mask, etc. Allocation to Shared Memory locations causes a Registry entry to be created. The "Interface Number" is only used for OSA purposes. Interface names in ASCII have an "0x00" termination (for example, "np4m0," "np4m1," etc. for the Escon Card or "ent0," "ent1," etc. termination for OSA processes). If both the CHPID_STATE_NP_CARD bit and the CHPID_STATE_OSA_CARD bit are 0, the chpid is neither NP nor OSA.

TABLE XII

| Parameters passed to Initialization Processes |
|---|
| OSA Recovery Process |
| Parameters |
| Chpid #From IOCDS Parsing code |
| OSA Chpid Process |
| Parms |
| Chpid # |

Sharing memory blocks per OSA process: A shared storage segment is allocated for each z/Emulator process. This allows access to the data from external processes (CEC dump, manop (manual operations), system event, etc.). The shared Memory Managed by CP Functions and needed by OSA Chpids are listed in the table below:

TABLE XIII

| Area Name/Reason | Size |
|---|---|
| Siga Vector | 256 bytes - allocated by IOP |
| CCA write and read memory | 64 bytes - allocated by IOP |
| SubChannel Bottom (SCB) | allocated by IOP |
| IO Chpid Registry | 256 × 512 Bytes - allocated by IOP |
| Trace | 1 Meg - allocated by OSA |
| Log | 256K - allocated by OSA |
| Logout Data | 512K - allocated by OSA |

The Signal Use for IOPLite systems is provided in the table below:

TABLE XIV

| Signals Name | Purpose |
|---|---|
| SIGALRM | Command Line Process and CHSC |
| SIGUSR1* | QDIO |
| SIGUSR2* | CCA Communication |
| SIGFP | LAN Driver |

Note:
SIGUSR1 is used for "CP - Chpid" operations for both OSA and Real I/O.
SIGUSR2 is used for "IOP - Chpid" operations for both OSA and Real I/O.

Logout Structure (See FIG. 3): Each Chpid allocates the shared memory blocks 300 that are used for tracing and logging. A total of 1.75 megabytes 310 320 is allocated per Chpid to perform these tasks. The OSA trace is a 1 megabyte circular trace 315, 325. Each entry consisting of a 32 byte entry: a trace code, followed by a timestamp, and then six 4 byte user-defined fields. The 256 K log 316, 326 is another circular trace of "important events" with the same format as the trace. The log out data area 317, 327 is a 512 K area that contains all of the statistical and operational parameters managed by the OSA process. Presently this data resides in local program storage and is moved to this area to facilitate debugging and information gathering. Table XV below describes the allocation routines and processes which use these areas. The command line functions, also described in Table XV, provide the basis for debugging and configuration of the OSA process. These commands fall into two categories: (1) commands that need to talk to a Chpid's shared memory locations exclusively; and (2) those that require a tap (another name for a mechanism for starting a process) to the OSA process to perform a certain operation. Each command's behavior is also described in Table XV. Note that the command line support becomes the basis for the GUI (Graphical User Interface) support for z/EC. Command line calls are generated by the GUI, the data collected, and are then properly presented by the GUI on the "HMC" (Hardware Management Console) like screens.

TABLE XV

| | |
|---|---|
| int rasInit(char const *componentName, char const *subCompName, , int totalSize, char cost * sharedObjName); | RAS shared segment<br>rasInit allocates a storage segment of specified size in 1k increments, registers the area as RAS shared resource (see Emily Shared Resource Registry) using a uniquely defined name within a userid, and stores the supplied sharedObjName. If sharedObjName is null, a default of fmt \|\| componentName is used. The sharedObjName defines the dynamic load library for the component's formatting routines. |
| int rasDefineTraceArea(char const * formatName, int entrySize, int entryCount); | Trace buffer allocation<br>The trace buffer is a circular buffer with each entry time stamped. Timestamping is done when an entry is added to the trace buffer by the rasAddTraceEntry function defined below. The timestamping allows merging of multiple trace buffers from multiple users. |
| void *rasDefineLogArea(char const * formatName, int entrySize);<br>int rasAddTraceEntry(int traceHandle, void * traceEntry); | Log buffer allocation.<br>The storage for the log buffer is assigned from the shared storage allocated in the rasInit API. The application passes a character name up to 63 characters in length and a request length in bytes. The API returns the address of the assigned area.<br>A user defined formatting function is invokable to format the log buffer when written to external media. See Formatting Section below. The name of the Formatting routine must be the same as the assigned log buffer. |
| void *rasGetNextTraceEntry(int traceHandle); | Trace Buffer<br>Get next free entry |
| int rasDumpTrace (char const * formatName); | Dump Trace Buffer<br>The rasDumpTrace function writes the trace area to external media. formatName specifies either a single trace buffer allocated by rasDefineTraceArea or a NULL pointer which causes each trace buffers assigned to the process to be written to a unique file. |

TABLE XV-continued

| | |
|---|---|
| int rasDumpLog (char const * formatName | Dump Log Buffer<br>The rasDumpLog function writes the log buffers to external media. formatName specifies either a single log buffer allocated by rasDefineLogArea or a NULL pointer which causes each log buffer assigned to the process to be written to a unique file. |
| int rasLogout (char const *componentName, char const *subCompName | Logout<br>The rasLogout function freezes the trace and log buffers for the specified componentName and subCompName. Once frozen, the function invokes the dump/formatting routines for the specified combination of componentName, and subCompName. By specifying "ALL" for the subCompName, all subcomponent log and trace buffers are written for the specified componentName |
| int sendCmdL (char const *componentName, char const *subCompName, arg0, arg1,..., NULL);<br>int sendCmdV (int argc, char const *argv [ ]); | Send command to command processor |
| int recvCmdResp (bfr,sizeof(bfr)); | Receive command from command processor |
| int emulatorCmd (char const *componentName, char const *subCompName , arg0,arg1, . . . , NULL); | The emulatorCmd function sends a command and its parameters to a z/Emulator component/subcomponent, displays command output and returns the command return code using the APIs detailed above. |

Attention is now directed to a description of the flow of how an operator command is processed. When the operator issues a command, a command initiator is started. The command initiator passes a command and the operator arguments to a target process through the EmulatorCmd interface and waits for the command to complete. A return code indicates the status of the operation. The target process polls occasionally to determine if there are any outstanding operator commands to be processed. It is up to the target process to provide support for that command. API functions return the data and return code to the initiator process. A more detailed flow description follows.

The command initiator executes the emulatorCmd function passing componentName as arg[0], subCompName as arg[1], the actual command to be executed (arg2), and command parameters as arg3 through argX. The componentName and subCompName fields are used to locate the process in the shared resource registry. The emulatorCmd function sends the command and parameters to the specified component and subcomponent using the sendCmdV. The SendCmdV function then sends a SIGALRM signal to the receiving process to ensure that the process exits any wait loop to run its command polling routine. The emulatorCmd function waits on the response data and return code. If a predetermined time passes and no data or return code is received, an error code is returned and command processing terminates. In the application's normal processing loop, the application invokes procCmd, passing the name of a function to handle any commands received via the emulator command interface. procCmd determines if a command has been received and invokes the passed command processing routine. The command to be executed is passed as arg0 and its parameters as arg1 through argx. The application command processing routine returns any data via a call to sendCmdResp using printf formatted parameters. At command completion, procCmd returns the return code from the command processing routine to the command initiator and this return code is the final return code. Back on the command initiation side, the command responses are retrieved via the recvCmdResp function and command and EmulatorCmd direct this output to stdout. The return code is retrieved via the recvCmd function.

Figure 3:
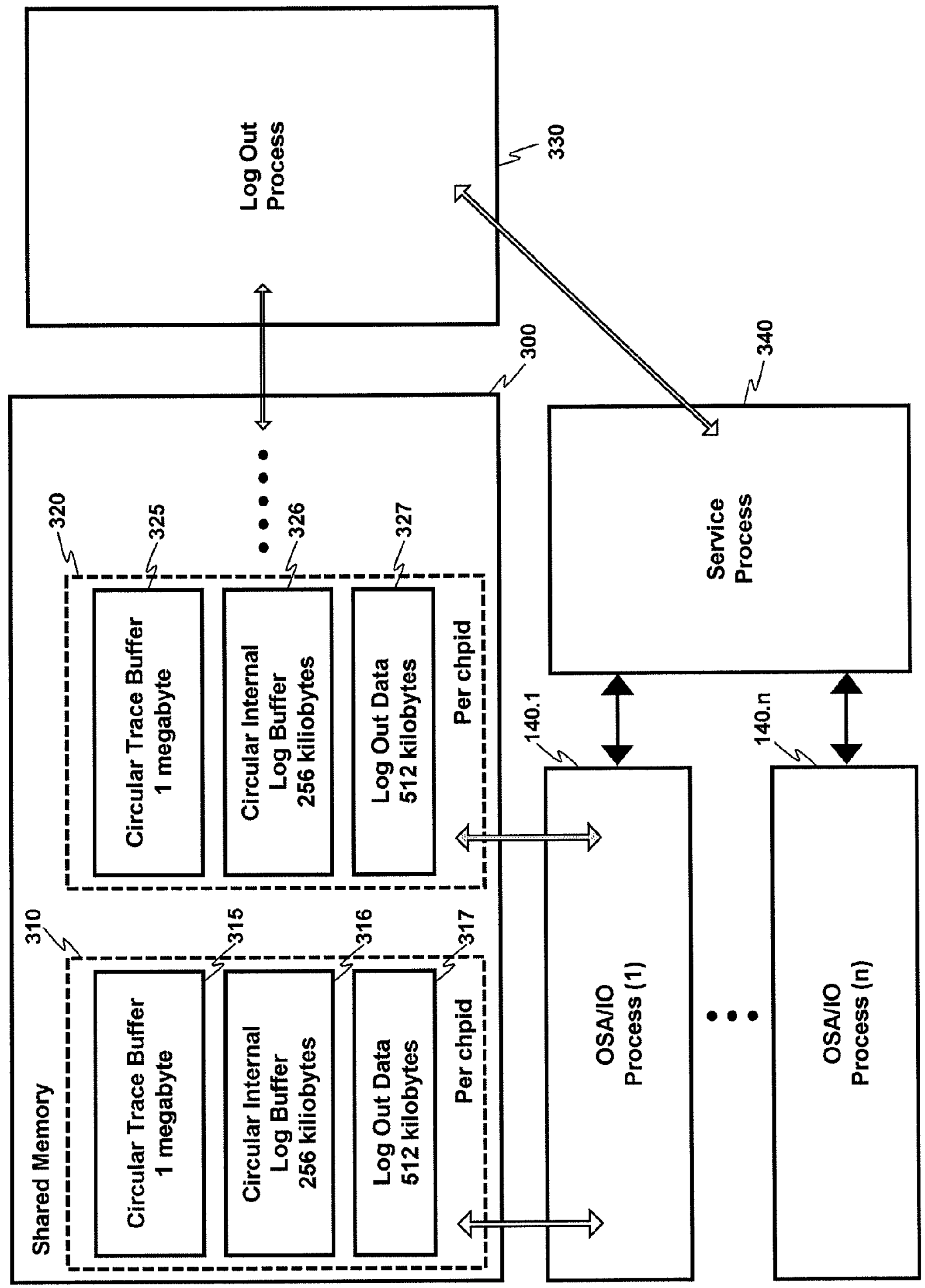
FIG. 3 is a block diagram illustrating the relation between an invoked OSA I/O process and a shared memory which is used for carrying out logging and service processes associated with the I/O function.

FIG. 3 illustrates the Diagnostic debug capability of the emulator. Trace buffers shown here speak to a number of processes 140.1...140.n, and 330. In particular, embodying the OSA process in an emulator enables one to effectively take the trace capability out of the OSA process 140.1...140.n. In case of a failure the information is still available. Block 340 is simply a GUI (Graphical User Interface) back end. The structure shown makes error detection and tracing more robust. More flexible functionality is provided through the use of software as opposed to hardware.

Figure 4:
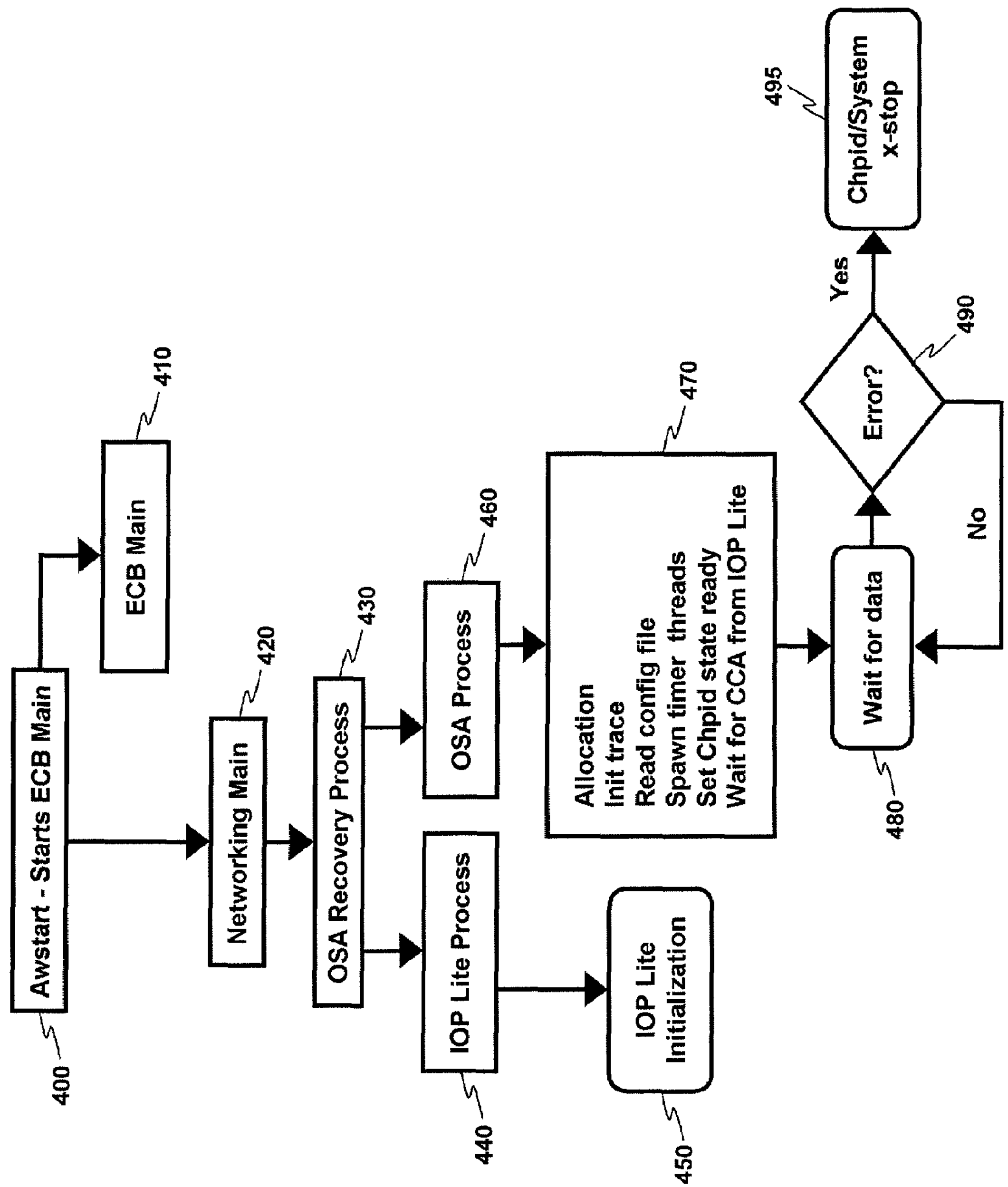
FIG. 4 is a flow diagram illustrating the emulated OSA process.

In FIG. 4, in one embodiment of the present invention, the process is seen to begin at step 400 in which ECB (Extended Control Block) Main is started (see block 410). ECB Main calls IOCDS parsing code which identifies possible OSA Chpid definitions. In this block the HSA is allocated and the HAS directory is created. After this the Chpid Registry is allocated and the Chpid type and state defined bits are filled in. ECB Main then calls the PCI_Configuration routine that finds valid system hardware.

After ECB Main finishes, the actions in the block labeled Networking Main are initiated. These include reading the Chpid Registry to find OSA cards and defined states. The OSA recovery process is started. Networking Main 420 is a parent to the OSA Process and the related IOPLite process. This process (430) provides all OSA recovery functions including a watchdog timer.

In the OSA recovery process (430) Chpid Registry Information is filled out and IOPLite process 440 is begun. After the IOPLite initialization process 450, the IOPLite process sends the first CCA to OSA process 140 when the IOPLite process sees a ready bit. The details of the CCA are provided by IOP.

The OSA process (block 460) fills out Chpid specific Chpid Registry information and starts the process shown in block 470. This process includes the allocation of buffers and the initialization of trace, log and memory areas (See also FIG. 3). The process in block 470 also reads a configuration file from disk and spawns timer threads. It also sets the Chpid state to "Ready" and waits for a CCA (Channel Communication Area) from the IOPLite process. Link initialization is part of zSeries initialization sequences. LCI (Load Control Image) provides an indication that operational code is loaded successfully and running. PCI provides an indication that the channel is now ready to receive commands.

The process then waits for the data (step 480) and as long as there is no error (step 490) the process returns to a "waiting for data" state (step 480). If there is an error a Chpid/System x-stop is issued (step 495).

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for implementing data transfer protocols which emulate an Open System Adapter, said computer program product comprising:

- a non-transitory storage medium readable by a processor and storing instructions for execution by the processor for performing a method comprising:
  - establishing a connection between a first portion of a host system memory, allocated for input/output operations, and a second portion of said host system memory, allocated as a buffer for data transfer operations based on said protocol;
  - initializing parameters used for directing and structuring said data transfer between said memory portions;
  - sending a data transfer related command to a first process;
  - sending a command from said first process to an Open System Adapter emulation process
  - transferring data, via memory copy operation, between said memory portions in accordance with said parameters and said commands;
  - employing a heartbeat message to detect hang conditions;
  - based on detecting a hanging condition, signaling said Open System Adapter emulation process that an abnormal end has been encountered; and
  - based on the signaling, initiating a logout process.

2. The computer program product of claim 1, wherein the method further includes initializing an area for the storage of trace information.

3. The computer program product of claim 2, wherein the method further includes storing trace information in said initialized storage area.

4. The computer program product of claim 2, wherein at least two Open System Adapter emulation processes have access to said trace information.

5. The computer program product of claim 1, wherein the method further includes storing logout information in one of said memory portions, wherein said logout information includes statistical and operational parameters managed by at least one emulated Open System Adapter process.

6. The computer program product of claim 1, wherein the method further includes storing Open System Adapter parameters in non-volatile memory.

7. The computer program product of claim 6, wherein the method further comprises selecting said Open System Adapter parameters from the group consisting of a MAC address and trace mask, whereby these parameters are preserved across system resets.

8. A computer system for implementing data transfer protocols which emulate an Open Systems Adapter, said computer system comprising:

- a system memory having program instructions stored therein for implementing a data transfer protocol which emulates an Open System Adapter, said instructions being executable so as to carry out a data transfer; and
- a processor in communications with the system memory, wherein the computer system is configured to perform a method, said method comprising:
  - establishing a connection between a first portion of a host system memory, allocated for input/output operations, and a second portion of said host system memory, allocated as a buffer for data transfer operations based on said protocol;
  - initializing parameters used for directing and structuring said data transfer between said memory portions;
  - sending a data transfer related command to a first process;
  - sending a command from said first process to an Open System Adapter emulation process;
  - transferring data, via memory copy operation, between said memory portions in accordance with said parameters and said commands;
  - employing a heartbeat message to detect hang conditions;
  - based on detecting a hanging condition, signaling said Open System Adapter emulation process that an abnormal end has been encountered; and
  - based on the signaling, initiating a logout process.

9. The computer system of claim 8, wherein the method further includes initializing an area for the storage of trace information, and storing trace information in said initialized storage area.

10. The computer system of claim 9, wherein at least two Open System Adapter emulation processes have access to said trace information.

11. The computer system of claim 8, wherein the method further includes storing logout information in one of said memory portions, and wherein said logout information includes statistical and operational parameters managed by at least one emulated Open System Adapter process.

12. The computer system of claim 8, wherein the method further includes storing Open System Adapter parameters in non-volatile memory, and further comprises selecting said Open System Adapter parameters from the group consisting of a MAC address and trace mask, whereby these parameters are preserved across system resets.

13. A method including instructions stored within a host system memory, for implementing data transfer protocols which emulate an Open System Adapter, said method comprising:

- establishing a connection between a first portion of said host system memory, allocated for input/output operations, and a second portion of said host system memory, allocated as a buffer for data transfer operations based on said protocol;
- initializing parameters used for directing and structuring said data transfer between said memory portions;
- sending a data transfer related command to a first process;
- sending a command from said first process to an Open System Adapter emulation process;

transferring data, via memory copy operation, between said memory portions in accordance with said parameters and said commands;

employing a heartbeat message to detect hang conditions;

based on detecting a hang condition, Open System Adapter emulation process that an abnormal end has been encountered; and based on the signaling, initiating a logout process.

14. The method of claim 13, further including initializing an area for the storage of trace information, and storing trace information in said initialized storage area.

15. The method of claim 14, wherein at least two Open System Adapter emulation processes have access to said trace information.

* * * * *